Dec. 23, 1930.  G. W. ELSEY  1,785,894

SHOCK ABSORBER

Filed May 28, 1926

Inventor
George W. Elsey
By Spencer Sewall & Hardman
his Attorneys

Patented Dec. 23, 1930

1,785,894

UNITED STATES PATENT OFFICE

GEORGE W. ELSEY, OF ANDERSON, INDIANA, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed May 28, 1926. Serial No. 112,266.

This invention relates to shock absorbers or rebound checks of the hydraulic type, and particularly to rebound checks for automotive vehicles.

One of the objects of the invention is to increase the rebound checking action of a shock absorber at a more rapid rate than heretofore as the vehicle body tends to rebound from the axle.

Further objects and advantages of the present invention will be apparent from the following description, reference being had to the accompanying drawings, wherein a preferred form of the present invention is clearly shown.

Figure 1:
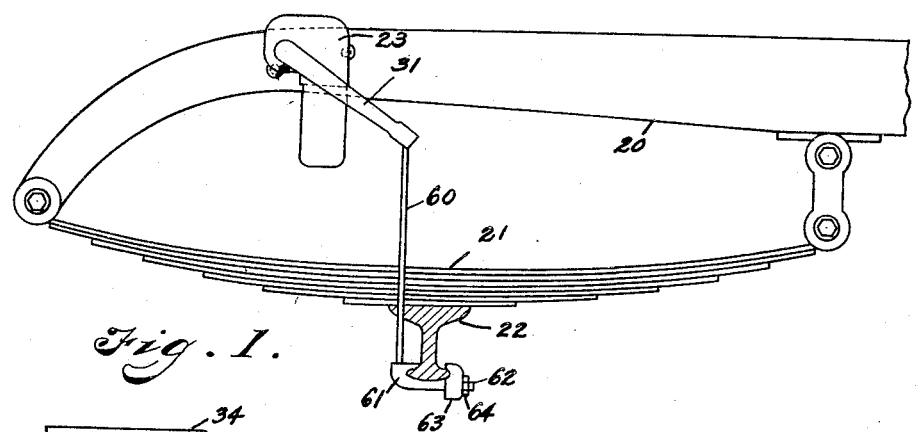
Fig. 1 is a diagrammatic fragmentary side view of the vehicle showing the application of the present invention thereto.

Referring to the drawings, 20 designates the side frame of a vehicle which is supported by a spring 21 upon an axle 22. The shock absorber comprises a hollow bracket 23 which supports a cylinder 24 cooperating with a piston 25. The piston head 26 carries a wear piece of harder metal 27, which is engaged by a lever 28 secured by screws 29 to a shaft 30. The shaft 30 is supported by bearings in opposite walls of the bracket 23 and is connected outside of the bracket 23 with an operating arm 31. The bracket 23 is attached to the side frame 20 in any suitable manner, as by screws 32 passing through the side frame 20 and received by holes 33 tapped into the bracket 23. The cylinder receives a quantity of relatively viscous fluid, such as lubricating oil, which is introduced through a suitable opening in the top of the housing 23. This opening is closed by a plug 34.

Figure 2:
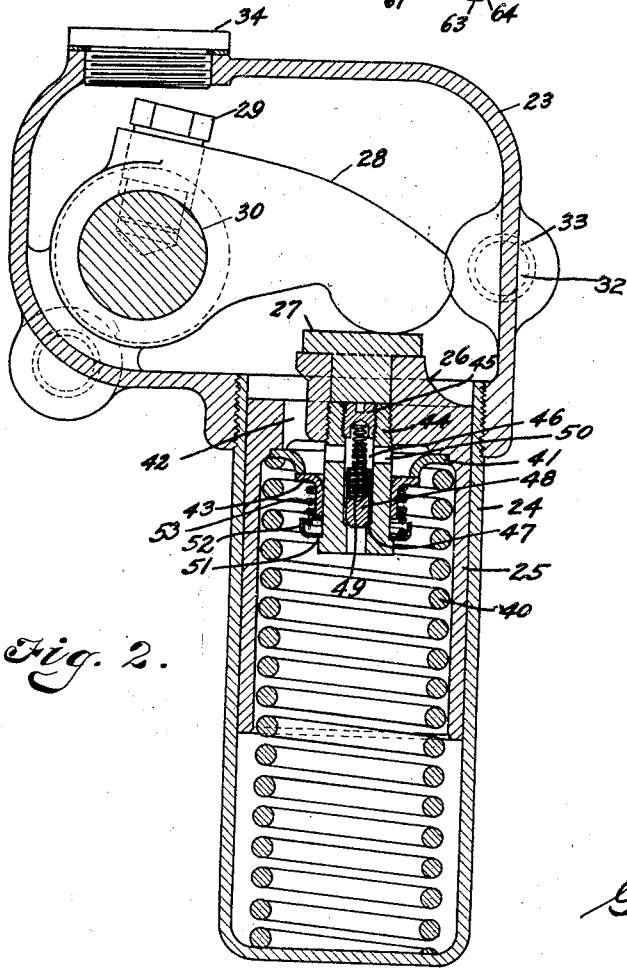
Fig. 2 is a vertical longitudinal sectional view of the shock absorber constructed in accordance with the present invention.

The piston 25 is maintained normally in the position shown in Fig. 2 by a spring 40 bearing at its lower end against the bottom of the cylinder 24 and at its upper end against an annular valve seat member 41, which the spring maintains against the lower side of the piston head 26. A duct, providing for the free flow of liquid from the upper side of the piston head 26 to the lower side, as the piston moves upwardly, is provided by one or more holes 42 in the piston head and by the passage through the valve seat member which is opened by the downward pressure of fluid against a check valve 43. The duct providing for the restricted flow of fluid through the piston head, as the piston moves downwardly, is provided by a tube 44 which is screwed into the piston head 26 and has its upper end closed by a plug 45. The central passage 46 of the tube 44 is necked down to provide a valve seat 47 which receives a plunger valve 48 yieldingly maintained upon its seat by spring 49 located between the valve 48 and the plug 45. Openings 50 through the side of the tube 44 connect the passage 46 with the space within the valve seat 41.

Tube 44 is provided exteriorly with a shoulder 51 which supports a washer 52. A spring 53, located between the washer 52 and the valve 43, tends to maintain the latter upon the seat 41.

The lever 31 is connected by a cable 60 with a clamping member 61 having a threaded shank 62 which extends through a plain hole in a clamping member 63 and receives a nut 64. By turning the nut in a certain direction, the members 61 and 63 are clamped about one of the flanges of the axle 22.

Relative movement between the frame 20 and the axle 22, decreasing the distance between these members, permits the operating arm 31 to move upwardly, thereby permitting the spring 40 to move the piston 25 upwardly. The upward movement of the piston 25 may take place relatively freely, since the check valve 43 will open to permit a relatively free passage of fluid from above the piston head 26 into the space below it. Thus the wear piece 27 is permitted to follow the lever 28. When the vehicle frame 20 tends to rebound from the axle 22, the lever arm 31 and, therefore, the piston 25 will be pulled downwardly. As the piston 25 moves downwardly, the check valve 43 will be held closed.

The valve 48 will remain upon its seat 47 until the pressure of the liquid below the valve 47 is sufficient to overcome the spring 49. Then liquid may flow through the annular space between the valve 48 and the tube 44. Although the valve 48 may be opened, the flow of liquid through the tube 44 is still restricted due to the relatively narrow passage between the valve 48 and the tube. Thus the spring-loaded check valve tends to hold back the flow of liquid through the tube 44 until a certain pressure has been reached in the liquid below the plunger valve 48.

Figure 3:
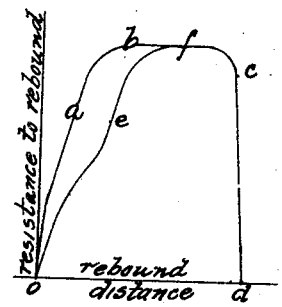
Fig. 3 is a chart illustrating the operation of the present invention.

In Fig. 3, the base line $o-d$ represents the maximum relative movement between the vehicle frame and axle. The distances from the points on the curves (which will be described), to the base line represent the rebound checking action or resistance offered by the shock absorber to the separation of the frame from axle. The curve $o-a-b-c$ represents the resistance to rebound offered by a shock absorber constructed in accordance with the present invention. It will be noted that this resistance increases relatively rapidly as the rebound distance increases, and that the maximum point "$b$" is reached at less than one-half the rebound distance. The curve $o-e-f-c$ represents the operation of a shock absorber not provided with a spring-loaded valve having the functions of the present valve 48, but one having simply a flow-metering passage through which liquid may flow at the same time the rebound motion begins. It will be noted that the point "$f$" of maximum resistance is not reached until considerably over half of the rebound movement has taken place. The present shock absorber is, therefore, more effective than one not provided with the novel features disclosed herein, since the maximum checking effect is attained sooner than heretofore and, therefore, maintained over a greater portion of the relative movement of rebound of the frame relative to the axle.

It will be noted that for any position of the valve 48, the dimensions of the annular flow-resisting passage provided between the cylindrical walls of the tube 44 and valve 48 remain the same. Hence, there is provided a constant metering orifice resisting the flow of liquid through the tube 44 after the valve 48 is lifted from its seat. Therefore, the resistance to rebound will vary according to approximately the second power of the velocity of rebound. In this respect the present invention possesses advantages over rebound checking apparatus using a conventional spring-loaded valve for controlling the flow-resisting by-pass around the main check valve. In such apparatus the flow-resisting orifice is not constant but varies with the opening of the flow-resisting valve. Hence the resistance to rebound will vary approximately as the first power of the velocity of rebound and not as the second power, as in the present invention. Therefore, the present shock absorber is more effective to dampen vehicle rebound than shock absorbers of the hydraulic type which have been known hitherto.

A relatively long and narrow annular metering passage, such as provided between the tube 44 and the valve 48, possesses an advantage over a relatively short circular metering passage, in that the shock absorber is quieter in operation.

While the form of embodiment of the present invention as herein disclosed, constitutes a preferred form, it is to be understood that other forms might be adopted, all coming within the scope of the claims which follow.

What is claimed is as follows:

1. A shock absorber comprising, in combination, a main lever whose motion in one direction is to be checked, a cylinder for containing a liquid, a bracket for supporting the cylinder, a piston within the cylinder, an operating member for positively moving the piston according to the movement of said lever, a duct through the piston providing for the relatively free flow of liquid, a check valve for preventing the flow of liquid through said duct when the piston moves in one direction, a duct member carried by the piston for by-passing said check valve, said duct member slidably supporting said check valve, a plunger valve within the duct and cooperating therewith to provide a flow-resisting passage of substantially constant dimensions for different positions of the plunger valve, and a spring for maintaining the plunger valve upon a valve seat provided by the duct in order to prevent liquid flow through said passage until a certain liquid pressure has been reached.

2. A shock absorber comprising, in combination, a main lever whose motion in one direction is to be checked, a cylinder for containing a liquid, a bracket for supporting the cylinder, a piston within the cylinder, an operating member for positively moving the piston according to the movement of said lever, a passage providing for the relatively free flow of liquid through the piston during its unchecked stroke and including an annular valve seat member, a check valve for engaging the seat, a spring for maintaining the valve upon its seat, a tube slidably supporting the check valve and supporting the spring and providing a passage by-passing said check valve during the checked stroke of said piston and having a valve seat, a plunger valve movable within the tube to provide therewith a flowing-resisting passage of substantially constant dimensions for different positions of the plunger valve, and a spring for retaining the plunger valve upon the last mentioned valve seat until a certain liquid pressure has been reached during the checked stroke of said piston.

3. A shock absorber comprising, in combination, a main lever whose motion in one direction is to be checked, a cylinder for containing a liquid, a bracket for supporting the cylinder, a piston within the cylinder, an operating member for positively moving the piston according to the checked movement of said lever, a duct providing for the relatively free flow of liquid during the unchecked stroke of said piston, a check valve for preventing flow of liquid through said duct during the checked stroke of said piston, a second duct member slidably carrying the check valve and having a tubular passage by-passing the check valve during the checked stroke of the piston and having a valve seat, a plunger valve within said duct member having its sides spaced substantially from the walls of the duct to provide a metering passage, said plunger valve having one end adapted to provide a valve cooperating with said seat, and a spring for urging the plunger valve against said seat, the metering passage around the plunger valve being substantially constant in dimensions for different positions of the plunger valve.

In testimony whereof I hereto affix my signature.

GEORGE W. ELSEY.